US009875579B2

(12) United States Patent
Menozzi et al.

(10) Patent No.: US 9,875,579 B2
(45) Date of Patent: Jan. 23, 2018

(54) TECHNIQUES FOR ENHANCED ACCURATE POSE ESTIMATION

(71) Applicant: Applied Research Associates, Inc., Albuquerque, NM (US)

(72) Inventors: Alberico Menozzi, Raleigh, NC (US); Herman Towles, Raleigh, NC (US)

(73) Assignee: Applied Research Associates, Inc., Albuquerque, NM (US)

( * ) Notice: Subject to any disclaimer, the term of this patent is extended or adjusted under 35 U.S.C. 154(b) by 36 days.

(21) Appl. No.: 14/832,550

(22) Filed: Aug. 21, 2015

(65) Prior Publication Data

US 2016/0055671 A1 Feb. 25, 2016
US 2016/0247318 A2 Aug. 25, 2016

Related U.S. Application Data

(60) Provisional application No. 62/040,615, filed on Aug. 22, 2014.

(51) Int. Cl.
*G06T 7/60* (2017.01)
*G06T 19/00* (2011.01)
(Continued)

(52) U.S. Cl.
CPC .......... *G06T 19/003* (2013.01); *G01C 21/165* (2013.01); *G01S 5/16* (2013.01); *G01S 5/163* (2013.01); *G01S 19/51* (2013.01); *G06T 7/73* (2017.01); *G06T 7/80* (2017.01); *G06T 19/006* (2013.01); *H04N 5/23229* (2013.01); *H04N 5/23293* (2013.01); *G01S 19/49* (2013.01);
(Continued)

(58) Field of Classification Search
CPC ................ G06T 19/003; G06T 19/006; G06T 2207/30244; G06T 7/70; G06T 7/73; G06T 7/77; G06T 7/80; G01C 21/02; G01C 21/06; G01C 21/08; G01C 21/04; G01C 21/165; G01C 21/28
See application file for complete search history.

(56) References Cited

U.S. PATENT DOCUMENTS

2014/0300686 A1* 10/2014 Campbell .......... H04N 5/23238
348/36

FOREIGN PATENT DOCUMENTS

CN 102902975 * 1/2013

OTHER PUBLICATIONS

State et al., Superior Augmented Reality Registration by Integrating Landmark Tracking and Magnetic Tracking, 1996, DepartmentofComputerScience, University of North Carolina at Chapel Hill.*

(Continued)

*Primary Examiner* — Spencer D Patton
(74) *Attorney, Agent, or Firm* — Dinsmore & Shohl LLP; Monika Jaensson; Bryan Walker

(57) ABSTRACT

The described technology regards an augmented reality system and method for estimating a position of a location of interest relative to the position and orientation of a display. Systems of the described technology include a plurality of sensors, a processing module or other computation means, and a database. Methods of the described technology use data from the sensor package useful to accurately generate signals to render graphical user interface information on a display, using vision-aiding processes, including horizon-matching, land-matching and Sun-matching.

24 Claims, 7 Drawing Sheets

(51) Int. Cl.
- *G01S 19/51* (2010.01)
- *G06T 7/80* (2017.01)
- *G01S 5/16* (2006.01)
- *G01C 21/16* (2006.01)
- *H04N 5/232* (2006.01)
- *G06T 7/73* (2017.01)
- *G01S 19/49* (2010.01)
- *G01S 19/53* (2010.01)

(52) U.S. Cl.
CPC ..... *G01S 19/53* (2013.01); *G06T 2207/30244* (2013.01)

(56) References Cited

OTHER PUBLICATIONS

Azuma, The Challenge of Making Augmented Reality Work Outdoors, 1999, Mixed Reality: Merging Real and Virtual Worlds.*

Ascension, "Flock of Birds," 2000, http://www.razor3d.co.kr/pds/ascension/flockofbirds.pdf.*

Menozzi, A.; Clipp, B.; Wenger, E.; Heinly, J.; Dunn, E; Towles, H.; Frahm, J.-M.; Welch, G., "Development of vision-aided navigation for a wearable outdoor augmented reality system," in Position, Location and Navigation Symposium—PLANS 2014, 2014 IEEE/ION , vol. No. pp. 460-472, May 5-8, 2014.

G. F. Welch, "History: The use of the kalman filter for human motion tracking in virtual reality," Presence, vol. 18, No. 1, pp. 72-91, 2009.

P. Corke, J. Lobo, and J. Dias, "An introduction to inertial and visual sensing," The International Journal of Robotics Research, vol. 26, No. 6, pp. 519-535, 2007.

National Imagery and Mapping Agency, "Nga: Dod world geodetic system 1984: Its definition and relationships with local geodetic systems." [Online]. Available: http://earthinfo.nga.mil/GandG/publications/tr8350.2/wgs84fin.pdf.

S. Maus, "An ellipsoidal harmonic representation of earth's lithospheric magnetic field to degree and order 720," Geochemistry, Geophysics, Geosystems, vol. 11, No. 6, pp. 1-12, 2010.

E. Rosten and T. Drummond, "Machine learning for high-speed corner detection," Computer Vision—ECCV 2006, pp. 430-443, 2006.

M. Calonder, V. Lepetit, M. Ozuysal, T. Trzcinski, C. Strecha, and P. Fua, "Brief: Computing a local binary descriptor very fast," IEEE Transactions on Pattern Analysis and Machine Intelligence, vol. 34, No. 7, pp. 1281-1298, 2012.

E. Rublee, V. Rabaud, K. Konolige, and G. Bradski, "Orb: An efficient alternative to sift or surf," in Computer Vision (ICCV), 2011 IEEE International Conference on, Nov. 2011, pp. 2564-2571.

F. Stein and G. Medioni, "Map-based localization using the panoramic horizon," in Proceedings of the IEEE International Conference on Robotics and Automation, 1992.

R. Behringer, "Improving the registration precision by visual horizon silhouette matching," Proceedings of the First IEEE Workshop on Augmented Reality, 1998.

L. Baboud, M. Cadik, E. Eisemann, and H.-P. Seidel, "Automatic photo-to-terrain alignment for the annotation of mountain pictures," Computer Vision and Pattern Recognition (CVPR), 2011 IEEE Conference on DOI-10.1109/CVPR.2011.5995727, pp. 41-48, 2011.

I. Reda and A. Andreas, "Solar position algorithm for solar radiation applications," Solar energy, vol. 76, No. 5, pp. 577-589, 2004.

* cited by examiner

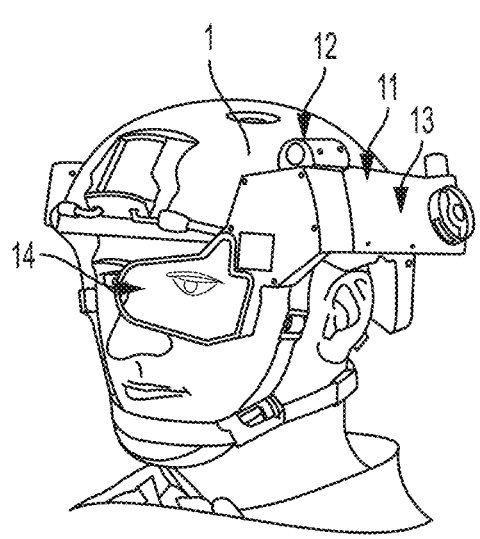
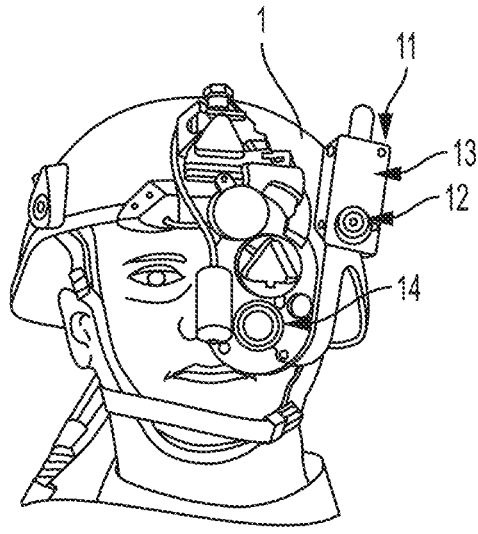
FIGURE 1A:                FIGURE 1B:
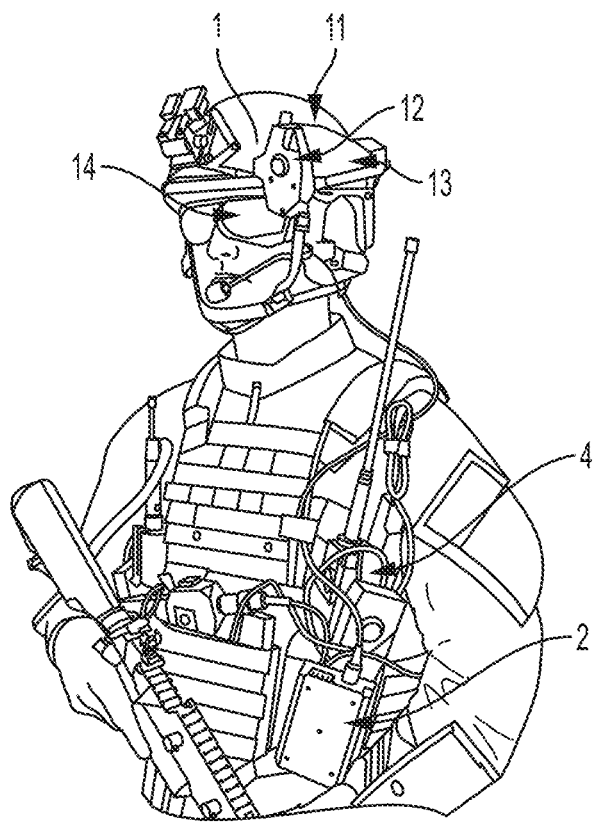
FIGURE 1C:

TECHNIQUES FOR ENHANCED ACCURATE POSE ESTIMATION

BACKGROUND

The described technology regards vision-aided navigation, and in particular pose estimation useful in vision aided navigation, advantageous in wearable augmented-reality (AR) systems operating in natural outdoor environments and other applications.

While a variety of GPS/INS solutions achieve pose estimation, currently available solutions do not offer the level of customization needed for a person walking over arbitrary outdoor environments. The systems and methods of the described technology take advantage of environmental features, such as landmarks, horizons, and the Sun, to significantly enhance pose estimation.

GENERAL DESCRIPTION

The described technology regards pose estimation systems useful in augmented-reality systems and other technology, including a plurality of sensors, a processing module and a database. The sensor package may include sensors such as a camera, a 3-axis accelerometer, a 3-axis angular rate gyro, a 3-axis magnetometer, a barometric pressure sensor, and a GPS receiver, and may be mounted to a rigid reference assembly. Data from the sensor package, which could include delayed measurements, is transmitted to the processing module or other computation means, which generates signals that render graphical user interface information on a display using the sensor data. The processing module also is communicatively coupled with and uses information from a database, which receives, stores, and transmits data such as locations of interest and objects in an environment in geodetic coordinates (latitude, longitude, altitude), and digital terrain and elevation data. Geo-spatial data relating to locations of interest and objects in the environment may be transferred to and from the database by means of a radio. The database may be local to the processing module, virtual, or stored in a single or network of remote servers on the Internet or otherwise accessible to the processing module.

The data received by the processing module may include time-stamped sensor values including camera imagery, accelerometer measurements, rate-gyro measurements, magnetometer measurements, barometric pressure sensor measurements, GPS receiver position measurements, and GPS receiver velocity measurements. From this data and the data representing the spatial position and orientation of the display relative to the spatial position of the sensors, the processing module calculates over time a position vector representing the current estimated position of a location of interest with respect to the display, expressed in display coordinates. In some embodiments the position vector derives from the sensor values received by the processing module, using an Extended Kalman Filter (EKF) structure, adjusted to compensate for magnetic model bias based on absolute azimuth measurements received from at least one vision-aiding process, for example by means of circuitry, firmware and/or a processor. The processing module then generates signals to render on a display, at a position derived from the position vector, graphical user interface information including a graphical icon representing the location of interest. The processing module may implement a baseline GPS/INS, modified by absolute orientation information when available.

The described technology relates to one or more tangible computer-readable storage media encoding computer-executable instructions for executing on a computer system a computer process that modifies an Extended Kalman Filter (EKF) prediction of the position and orientation (pose) of a display, used to calculate the position of a location of interest relative to the pose of the display, based on absolute azimuth measurements from at least one vision-aiding process.

The described technology further includes a pose estimation system for use with a display. The pose estimation system may include a plurality of sensors, a database including geodetic coordinates of a location of interest, and a processing module. The processing module receives over time data from the sensors and data representing the spatial position and orientation of the display relative to the spatial position of the sensors, applies an Extended Kalman Filter (EKF) to the received data to estimate the pose of the display and calculating therefrom a position of the location of interest relative to the pose of the display, modifying the estimated pose of the display based on absolute azimuth measurements from at least one vision-aiding process.

The described technology further regards a method for providing an estimate of the position of a location of interest relative to a display. This method includes the steps of receiving sensor data from a plurality of sensors, receiving data comprising geodetic coordinates of a location of interest, receiving data representing the spatial position and orientation of a display relative to the spatial position of the sensors, applying an Extended Kalman Filter (EKF) to the received data to estimate the pose of the display, and calculating therefrom the position of the location of interest relative to the pose of the display, modifying the estimated display pose based on absolute azimuth measurements from at least one vision-aiding process.

The described technology further includes a pose estimation system for use with a display, including means for receiving sensor data from a plurality of sensors, means for receiving data comprising geodetic coordinates of a location of interest, means for receiving data representing the pose of a display relative to the spatial position of the sensors, means for applying an Extended Kalman Filter (EKF) to the received data to estimate the pose of the display and calculate position of a location of interest relative to the pose of the display, and means for modifying the estimated display pose based on absolute azimuth measurements from at least one vision-aiding process.

Vision-aiding processes useful to adjust the display pose vector include landmark-matching, horizon-matching, and Sun-matching processes. In landmark-matching processes, the camera captures an image of a landmark, the geodetic coordinates of which are already stored in the database. The processing module then extracts features from the landmark in the image and compares the features to the geodetic coordinates of the landmark in the database, calculating therefrom measurements of absolute orientation of the camera. By comparing the absolute orientation of the camera to the predicted orientation of the camera, the processing module can adjust the estimated display pose to compensate for magnetic model bias.

In horizon matching, the camera captures an image that includes the horizon, and extracts and aligns the horizon from the image with a three-dimensional height map of the surrounding terrain in the database. Thereby, the camera's absolute orientation can be measured, and this measurement is used by the processing module to update the display pose position vector.

In Sun-matching processes the process uses an image captured by the camera, including the Sun, and determines the pixel coordinates of the Sun's centroid in the image. These coordinates may be converted into a measured Sun vector in body coordinates and North-East-Down coordinates. From these coordinate systems, the true rotation matrix between the body and North-East-Down coordinate systems can be calculated, and the pose estimate of the display may be updated accordingly.

DRAWINGS

FIGS. 1A, 1B and 1C depict example embodiments of the system of the described technology.

DETAILED DESCRIPTION

Figure 2:
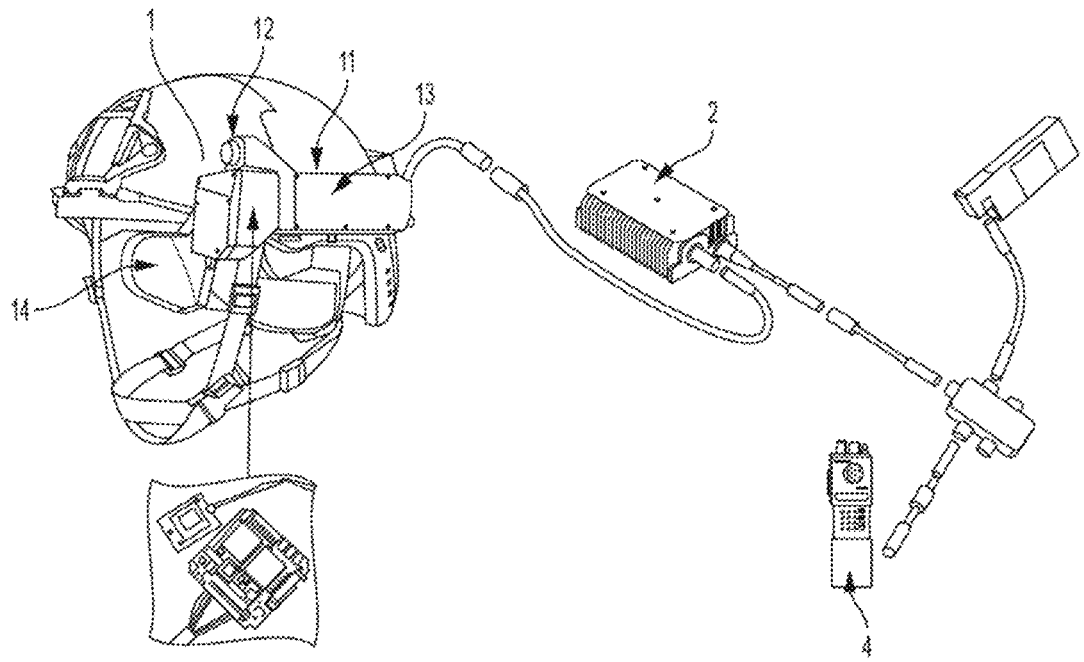
FIG. 2 is a peripheral view of an example embodiment of the system of the described technology.

The augmented reality system of the described technology comprises in some embodiments a motion sensing and visualization kit 1, an augmented-reality processing module 2 with a database, and may include a radio 4, as depicted in FIG. 1C and FIG. 2. The database may be remote from the visualization kit and the processing module.

The motion sensing and visualization kit 1 may include a rigid reference assembly 11 with a camera (high-speed and high-resolution) 12 and a sensor package 13, and having a display 14 with a graphical user interface 141 rendered on the display to convey information in the form of text and graphics, an example of which is shown in FIGS. 1A, 1B, 1C, 2 and 9. In some embodiments of the system of the described technology the display 14 is see-through. The sensors and processing module of the described technology can function with a wide variety of displays, including by example and without limitation see-through displays manufactured by the BAE, Lumus, and SA Photonics.

Figure 3:
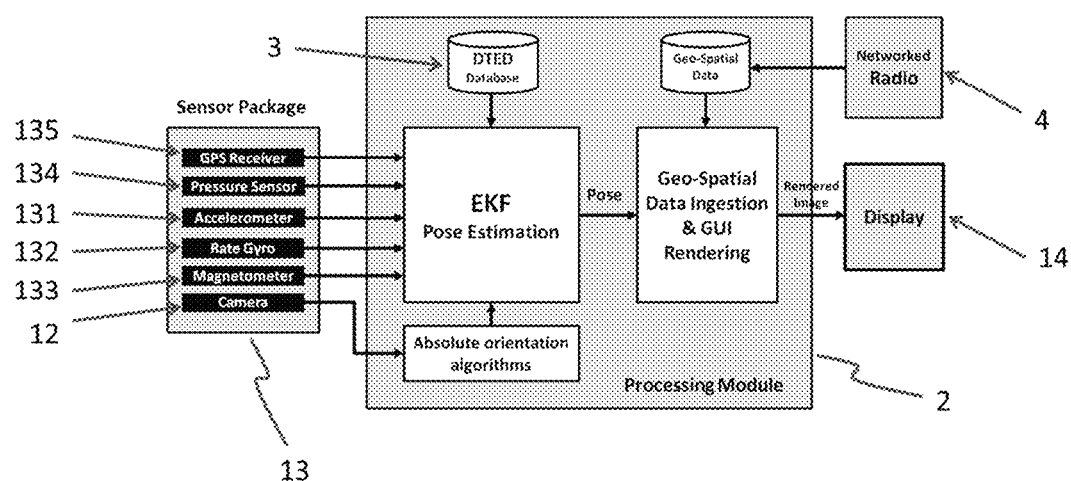
FIG. 3 is a block diagram of the sensor package and the processing module of an example embodiment of the system of the described technology.

As depicted in FIG. 3, the sensor package 13 includes a plurality of sensors, including for example a 3-axis accelerometer 131, a 3-axis angular-rate gyro 132, a 3-axis magnetometer 133, a barometric pressure sensor 134, a GPS receiver 135 and a camera 12. The sensors may be mounted to the rigid reference assembly as a packaged unit. While described as a package, the sensors may be individually positioned about the rigid reference assembly 11 or on the user's clothing or other equipment, in accordance with the technology as herein described. The rigid reference assembly may be a helmet, or any other structure capable of supporting the sensors.

The sensors 13 are in wired communication (via a cable, or other hard wire) or wireless communication (via Bluetooth or other wireless communication means) with the processing module 2 or other computation means. As hereinafter described, the processing module processes data from the sensors and data from a database to generate display pose, and renders tactically-relevant information on the motion sensing and visualization kit's display 14. In some embodiments the processing module is carried on the user's body when the system is in operation. Coupled with the processing module is a database 3 including the geodetic coordinates (longitude, latitude and altitude) of locations of interest and landmarks, and digital terrain and elevation data (DTED) to aid in the estimation of altitude. The processing module further includes custom software and standard libraries to receive geo-spatial data (i.e., latitude, longitude and altitude information about objects in the environment) via a radio network or otherwise, and software to render this data to a GUI 141.

The processing module or other computation means may be in wired communication (via a cable, or other hard wire) or wireless communication (via Bluetooth, or other wireless communications means) with a display 14. The processing module may also be coupled by wire or wireless communication with a radio 4, which receives signals relating to data in the database, and supports receiving and parsing XML-based messages from a digital radio network.

Figure 9:
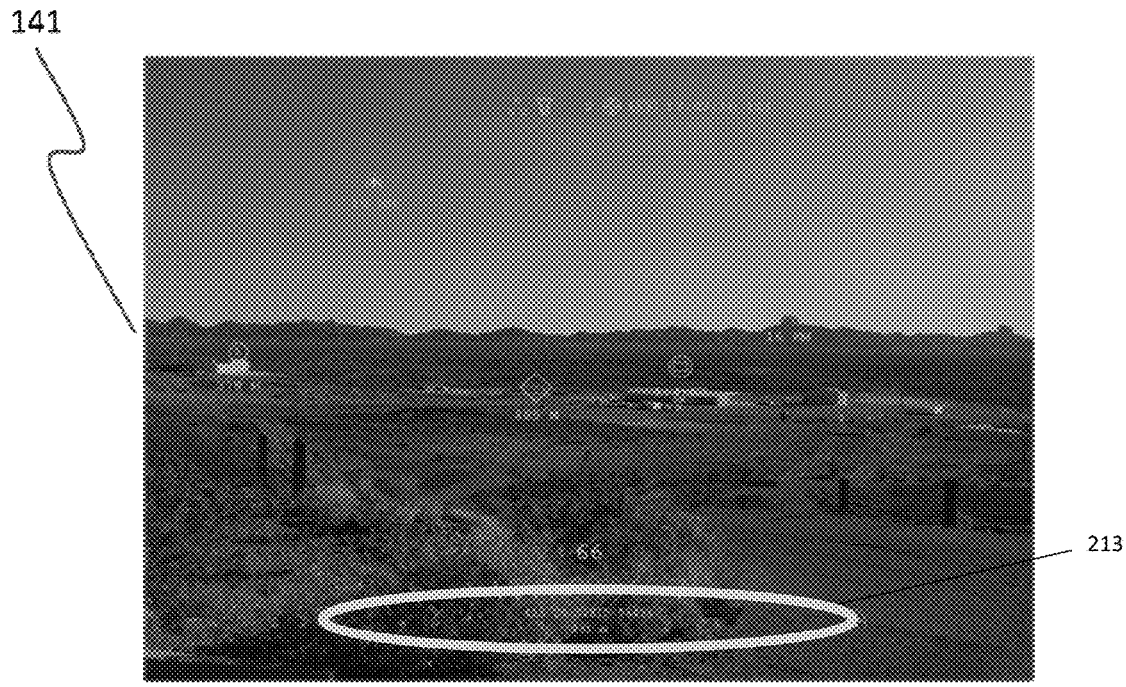
FIG. 9 shows an example embodiment of the user interface/display of the system and method of the described technology.

Further, as shown in FIG. 9, the user interface/display 141 may provide operational alerts (e.g., notification that the radio network is inoperable, that the system is magnetically-disturbed, or the GPS signal is denied or degraded), system status information (e.g., user interface mode ID, system battery level, operational time), system settings menu access, iconic visualization of geo-registered points of interest, and a situational awareness ring. A menu may not be displayed until activated by the user via a button/toggle switch located on or coupled with the motion sensing and visualization kit 1; with the menu, the user may access and change system configuration settings. The situational awareness ring shown in FIG. 9 is an intuitive tool that offers the user in a military application a dynamic real-time 360° understanding of where friendlies, enemies and other points of interest are located. At the center of the grid is the user's Military Grid Reference coordinate; located above the ring is the user's heading (on the fly configurable as magnetic or true). Icons may move around the ring in response to user rotation. Geo-registered icons and those on the situational awareness ring are displayed in some embodiments with range information from the user, and in some cases elevation (for aircraft icons). Various components of the system may be powered by one or more batteries.

Suitable hardware for use in the processing module 2 include embedded processing modules with, for example, an NVidia Tegra 3 system-on-chip and DDR3L memory. Similar suitable hardware may be found in current cell-phone quad-core computing platforms.

Over time, in periodic intervals, the sensors 13 measure various conditions, and transmit time-stamped signals representing the measurements to the processing module 2. Specifically, the accelerometer 131 provides a measure $y_a$ of the difference between linear acceleration of the sensor and the Earth's gravity vector, the rate gyro 132 provides a measure $u_g$ of angular rate, the magnetometer 133 provides a measure $y_m$ of the Earth's magnetic field to help in determining azimuth, and the barometric pressure sensor 134 provides a measure $y_{bp}$ of barometric pressure for estimating altitude. Similarly, the GPS receiver 135 provides its position data $y_{Gp}$ (latitude, longitude, and altitude) and its velocity data $y_{Gv}$ (North, East, and Down velocities). The camera 12 captures and transmits to the processing module 2 digital imagery that is processed by the processing module to provide vision-based information useful to calculate absolute orientation.

The processing module 2 or other computation means receives measurements from the sensors 13, and calculates over time the position and orientation of the display (fixedly coupled with the camera and the sensors), and the position vector of a location of interest s relative to the spatial position of the display 14.

The vector of the location of interest s so calculated by the processing module is referred to as vector $r_{ds}^d$, representing the current estimated position of s relative to the position of the display (such as the orientation, geodetic position (longitude, latitude, altitude), or combination thereof), expressed in display coordinates. The display pose estimations are based upon an Extended Kalman Filter (EKF) structure, performed by an "EKF Calculator" stored in memory and executable by a processor to calculate state predictions. The EKF Calculator may include software and/or hardware elements, and may be implemented in any tangible computer-readable storage media. "Tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

The Extended Kalman Filter (EKF) is a method for estimating a set of quantities describing a system, referred to as system states, given a set of measurements and a pair of mathematical models. The measurements include system data, typically collected by sensors as the system operates. The first mathematical model, referred to as the process model, describes the evolution of the system states over time. The second mathematical model, referred to as the measurement model, describes how the measurement data is related to the states. Being only an approximation, each model must include a measure of its uncertainty, which the EKF uses to produce an estimate of the system states from the information at hand. It does so by starting from initial estimates of the system states and their uncertainty, valid at some initial time $t_0$, and using the process model to produce new estimates, called the prediction, valid at some later time $t_1$ when measurement data is also available. At time $t_1$, the new information provided by the measurement data, weighted using the measurement model, is used to make an update to the prediction, resulting in the final estimates of the system states and their uncertainty at $t_1$. This prediction-update cycle continues as long as measurement data is available, producing estimates of system states and their uncertainty along the way.

The EKF structure may include a rewind buffer to integrate delayed measurements, or forward buffer to store current and predicted state estimates calculated by the processing module, or both. Using the vectors $r_{ds}^d$ calculated by the processing module, the processing module 2 or other computation means generates signals to render graphic symbology on the display 14, corresponding to the location of interest s, that appears to the user to be attached to that real-world location (i.e., geo-registered). The system may use DOD-standard MIL-STD-2525C symbology, which distinguishes between hostile, friendly, neutral and unknown symbols based on shape and color.

Specifically, the processing module 2 or other computation means implements a baseline GPS/INS, and aids it with vision-based and other non-inertial absolute orientation information when available. The baseline GPS/INS is designed to provide a nominal level of performance when vision-aiding and other measurements are not available, and integrate them when available for improved performance, without assumptions about their availability or periodicity. The system may further utilize measurements and computations to address latency and enhance robustness of the system in the presence of magnetic or dynamic disturbances, as hereinafter described.

The vision processes of the system are implemented as a module that may or may not provide measurements, depending on the circumstances; these are measurements of absolute orientation (i.e., orientation with respect to the Earth) that are generated by one or more vision-based methods, including landmark matching (LM), horizon matching (HM) and Sun-matching (SM). Landmark matching requires the user to align a cross-hair (rendered on a display) with a distant feature of known coordinates, while horizon matching functions automatically without user involvement. Similarly, Sun-matching absolute orientation measurements may be generated without user involvement in accordance with the technology, as herein described.

The EKF structure used in the processing module 2 may accommodate and align time-delayed measurements using a buffer scheme. The processing module may further selectively filter the rate-gyro measurement vector $u_g$ transmitted to the processing module, based on the magnitude of the vector $u_g$. The processing module may also augment the standard predict-update cycle of the EKF process with an additional step to reduce prediction error and improve responsiveness to rate gyro and accelerometer inputs, as hereinafter described.

In some embodiments of the described technology the processing module 2 maintains and adjusts an estimate of magnetic model bias based on absolute azimuth measurements received from the vision-aiding processes (landmark matching, horizon matching, Sun matching). In some embodiments the camera 12 captures and transmits digital signals representing pictures from its field of view to the processing module 2, and the processing module performs a matching process to provide an independent measurement of azimuth in the system, and adjusts its azimuth and magnetic model bias estimates based upon such independent measurement.

By means of the processing module 2 or other computation means and associated standard libraries, the GUI 141 renders a situational awareness ring and one or more icons on the display representing positions of locations of interest, using the vector $r_{ds}{}^d$ transmitted by the processing module.

Figure 4:
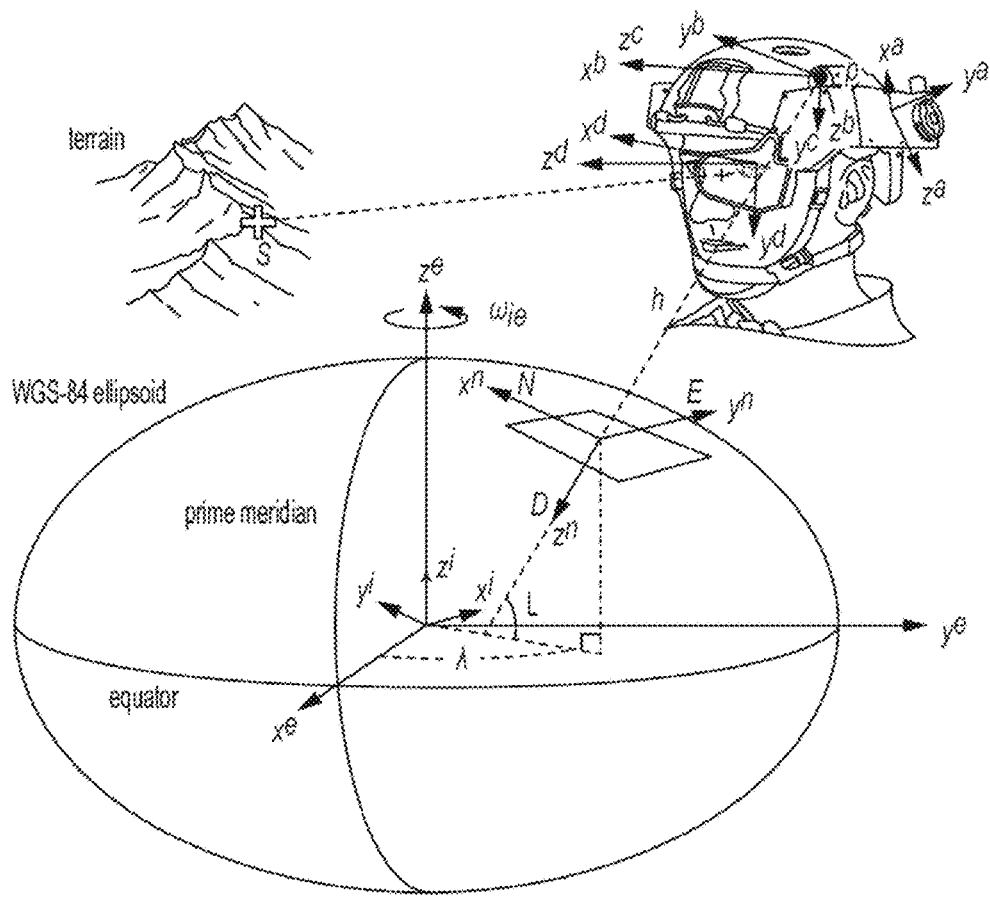
FIG. 4 shows the various coordinate systems useful in the described technology.

Various coordinate systems are involved in the calculations of the described technology, as depicted in FIG. 4. The body coordinate system b is the reference for the motion sensing and visualization kit 1, with origin at the point p. The camera coordinate system c consists of permutation of the body coordinate system's axes and shares the same origin. The display coordinate system d and the accelerometer coordinate system a are both rigidly attached to the body coordinate system. Coordinate system a is the reference for the motion sensing and visualization kit's sensor package 13. Coordinate system n is the North-East-Down (NED) reference for navigation. The Earth-Centered Earth-Fixed (ECEF) coordinate system e is used to specify points in the environment. Coordinate system i is the Earth Centered Inertial (ECI) coordinate system, which is a good approximation of a true inertial reference in the context of the described technology. The WGS-84 ellipsoid is used as the world model.

The processing module calculates the position vector $r_{ds}{}^d$ of a point s in the environment with respect to the origin of d, expressed in d coordinates, using the formula:

$$r_{ds}{}^d = (C_n{}^p C_b{}^n C_d{}^b)^T [r_{es}{}^p - (r_{ep}{}^p + C_n{}^p C_b{}^n r_{pd}{}^b)]$$

wherein $r_{pd}{}^b$ is the position of the origin of d with respect to p, expressed in b coordinates, obtained from physical measurements on the actual system or measurements on its solid-model drawing equivalent.

$r_{es}{}^e$ is the position vector of a point s in the environment with respect the origin of e, expressed in e coordinates, obtained by converting the known latitude, longitude, and altitude of the point s from the database into equivalent Cartesian coordinates.

$r_{ep}{}^e$ is the position of p with respect to the origin of e, expressed in e coordinates, obtained by converting the latitude, longitude, and altitude of the point p into equivalent Cartesian coordinates. The latitude, longitude, and altitude of the point p are estimated by the system's EKF using sensor data, as hereinafter described.

The position vectors of points s ($p_s$) and p ($p_p$) with respect to the origin of e are specified in terms of latitude, L, longitude, λ, and altitude, h. The position vector $p_s$ is stored in the database 3; the position vector $p_p$ is calculated using the method as hereinafter described. The conversion from latitude, longitude, and altitude coordinates into their Cartesian equivalents is performed by the processing module of the described technology, by the mapping:

$$x^e = (R_N(L) + h) \cos L \cos \lambda$$

$$y^e = (R_N(L) + h) \cos L \sin \lambda$$

$$z^e = [1 - e^2)(R_N(L) + h)] \sin L$$

wherein $R_N(L)$ and e are WGS-84 ellipsoid parameters.

$C_n{}^e$ represents the orientation of the North-East-Down (n) coordinate system (see FIG. 4) with respect to the Earth-Centered Earth-Fixed (e) coordinate system, obtained from a known coordinate transformation that is a function of latitude, longitude, and altitude of the point p. The latitude, longitude, and altitude of the point p are estimated by the system's EKF using sensor data.

$C_b{}^n$ represents the orientation of the body coordinate system (b) (see FIG. 4) with respect to the North-East-Down (n) coordinate system.

$C_b{}^n$ is estimated by the system's EKF using sensor data.

$C_d{}^b$ represents the orientation of the display coordinate system (d) with respect to the body coordinate system (b) obtained from a-priori calibration based upon alignment of features in an image acquired by the camera and expressed in body coordinates with corresponding features in the same image expressed in display coordinates.

Once $C_b{}^n$ and $p_p$ are estimated using the system's EKF, the processing module 2 generates signals to render the GUI information on the display 14 so that an icon representing the position s can be rendered at display coordinates $r_{ds}{}^s$.

The EKF used in the processing module 2 of the described technology is based upon the general model:

$$\frac{dx}{dt} = f(x, u, w, t)$$

$$\hat{y}_k = h_k(x_k, v_k)$$

where t is time, f is a continuous-time process, $h_k$ is a discrete-time measurement (with output $\hat{y}_k$), x is the state vector, $x_k$ is its discrete-time equivalent, and u is the input vector. The vector w is a continuous-time zero-mean white noise process with covariance Q (denoted as $w \sim \mathcal{N}(0,Q)$) and $v_k$ is a discrete-time zero-mean white-noise process with covariance $R_k$ (denoted as $v_k \sim \mathcal{N}(0,R_k)$).

The state is defined as $x = [p_p; v_{ep}{}^n; q_{nb}; b_g; b_a]$ (semicolons are used to indicate column stacking), wherein $v_{cp}{}^n$ is the velocity of the point p with respect to the ECEF coordinate system, expressed in NED coordinates, and $q_{nb}$ is the quaternion representation of $C_b{}^n$. The vector $b_g$ is the rate-gyro bias, and the vector $b_a$ is the accelerometer bias. The rate gyro and accelerometer data are inputs to the process model, so that $u = [u_a; u_g]$, with $$u_a = f_{ip}{}^b + b_a + w_a$$

$$u_g = \omega_{ib}{}^b + b_g + w_g$$

where $f_{ip}{}^b = (C_b{}^n)^T [a_{ep}{}^n - g^n + (\omega_{en}{}^n + 2\omega_{ie}{}^n) \times v_{ep}{}^n]$ is the specific force at p, $\omega_{ib}{}^b$ is the angular rate of the body coordinate system with respect to the ECI coordinate system (i), $\omega_{en}{}^n$ is the angular rate of n coordinate system with respect to the e coordinate system (expressed in n coordinates), $\omega_{ie}{}^n$ is the angular rate of the e coordinate system with respect to the i coordinate system (also expressed in n coordinates), $w_a \sim \mathcal{N}(0, Q_a)$ and $\omega_g \sim \mathcal{N}(0, Q_g)$. The cross product in the $f_{ip}{}^b$ expression is a Coriolis and centripetal acceleration term due to motion over the Earth's surface, and can be neglected when the velocity is small (which is the case for pedestrian navigation).

Using the state definition and input model described above, the process model is specified by the following equations:

$$\dot{p}_p = f_p(x) + w_p$$

$$\dot{v}_{ep}{}^n = C_b{}^n(u_a - b_a - w_a) + g^n - (\omega_{en}{}^n + 2\omega_{ie}{}^n) \times v_{ep}{}^n + w_v$$

$$\dot{q}_{nb} = \frac{1}{2}\Omega(q_{nb})(u_g - b_g - w_g - \omega_{in}{}^b) + w_q$$

-continued $$b_g = w_{b_g}$$
$$b_a = w_{b_a}$$

where $$f_p = \begin{bmatrix} \frac{1}{R_M(L)+h} & 0 & 0 \\ 0 & \frac{1}{(R_N(L)+h)\cos L} & 0 \\ 0 & 0 & -1 \end{bmatrix} v_{ep}^n,$$

$R_M$ and $R_N$ are WGS-84 parameters, $g^n$ is the acceleration due to gravity, $\Omega$ is a 4×3 matrix that transforms an angular rate vector into the corresponding quaternion derivative, and $\omega_{in}^b = (C_b^n)^T(\omega_{ie}^n + \omega_{en}^n)$. The process noise vector is $w=[w_p; w_v; w_q; w_g; w_{b_g}; w_a; w_{b_a}]$, and its covariance matrix is $Q$=blkdiag, $(Q_p, Q_v, Q_q, Q_g, Q_{b_g}, Q_a, Q_{b_a})$. The measurement vector is defined as:

$$\hat{y}_k = \begin{bmatrix} \hat{y}_{AO} \\ \hat{y}_a \\ \hat{y}_m \\ \hat{y}_{Gv} \\ \hat{y}_{Gp} \\ \hat{y}_D \end{bmatrix} = \begin{bmatrix} q_{nb} + v_{AO} \\ (C_b^n)^T(a_{ep}^n - g^n) + b_a + v_a \\ (C_b^n)^T m^n + v_m \\ v_{ep}^n + v_{Gv} \\ p_p + v_{Gp} \\ h + v_D \end{bmatrix}$$

where $\hat{y}_{AO}$ is an absolute orientation measurement, $\hat{y}_a$ is the accelerometer measurement, $\hat{y}_m$ is the magnetometer measurement, $\hat{y}_{Gv}$ is the velocity measurement, $\hat{y}_{Gp}$ is the GPS horizontal position (i.e., latitude and longitude) measurement, and $\hat{y}_D$ is the measurement of altitude based on DTED. The measurement noise vector is $v_k=[v_{AO}; v_a; v_m; v_{Gv}; v_{Gp}; v_D]$, and its covariance matrix is $R_k$=blkdiag ($R_{AO}, R_a, R_m, R_{Gv}, R_{Gp}, \sigma_D^2$).

Because of the block-diagonal structure of $R_k$, the EKF measurement update step is executed by processing measurements from each sensor as separate sequential updates (in the same order as they appear in the $\hat{y}_k$ vector above).

The gravity vector is approximated as being perpendicular to the WGS-84 ellipsoid and therefore modeled as $g^n=[0; 0; g_0(L)]$, where the down component $g_0(L)$ is obtained from the known Somigliana model. Since they are used as measurements of the gravity vector in body coordinates, accelerometer-based updates are only valid if the acceleration $e_{ep}^n$, is zero. If not, these measurements are considered to be corrupted by an unknown dynamic disturbance. However, this disturbance is addressed by detecting its presence and, consequently, increasing the corresponding measurement noise covariance matrix, $R_a$, by a large factor $\rho_a$ (e.g., $\rho_a=100$). Detection is based on comparing the norm of the accelerometer measurement to $\|g^n\|$, and also checking that the measured angular rate is lower than a threshold whose value is application dependent (e.g., 3°/sec. in certain conditions). In head-worn applications, the location of the sensor package on the motion sensing and visualization kit, and the corresponding kinematics due to head movement, result in angular rate being a very good indicator of $a_{ep}^n$. The approach of increasing $R_a$ implies that the unknown acceleration $a_{ep}^n$ is modeled as a stationary white noise process. Though the actual process is not stationary or white, it was found experimentally that this approach yields better results than the alternative of completely rejecting accelerometer measurements that are deemed disturbed. In fact, when testing this alternative, it was observed that a single valid measurement after long periods of dynamic disturbance (as in the case when walking) could cause undesirable jumps in the estimates of $b_g$ and $b_a$, while increasing $R_a$ resulted in no such issues.

Magnetometer-based measurement updates are valid if the magnetic field being measured is the Earth's magnetic field only. Otherwise, these measurements are considered to be corrupted by an unknown magnetic disturbance. Therefore the processing module or other computation means may detect the presence of magnetic disturbances and, if detected, rejects the corresponding magnetometer measurements. Detection is based on comparing the norm of the measured magnetic field vector $y_m$ to the Earth's field strength $B_m$, as well as checking that the computed inclination angle is not too far (e.g., 0.5 deg) from the nominal value. Since it is based on the inner product $y_m^T y_a$, the latter check is only performed if no dynamic disturbance is detected.

Figure 5:
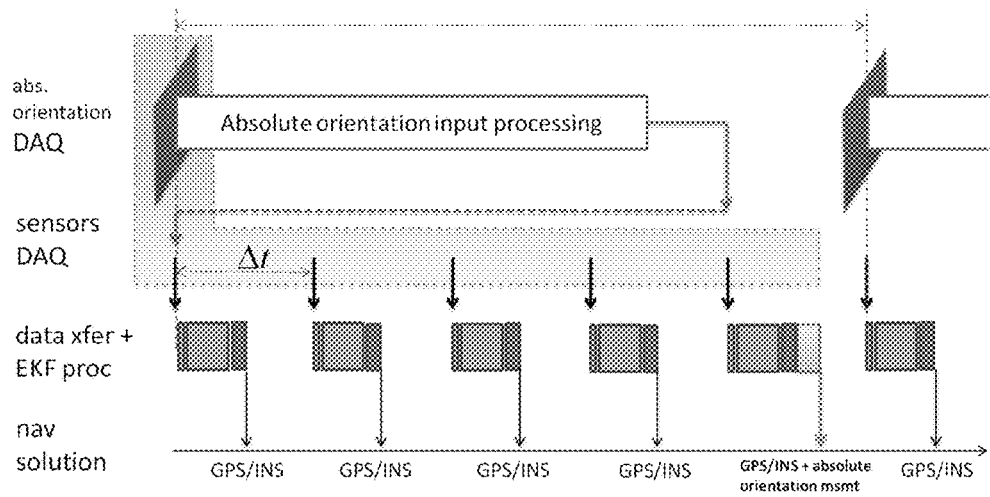
FIG. 5 is a qualitative timing diagram of the EKF processing of example embodiments of the described technology.
Figure 6:
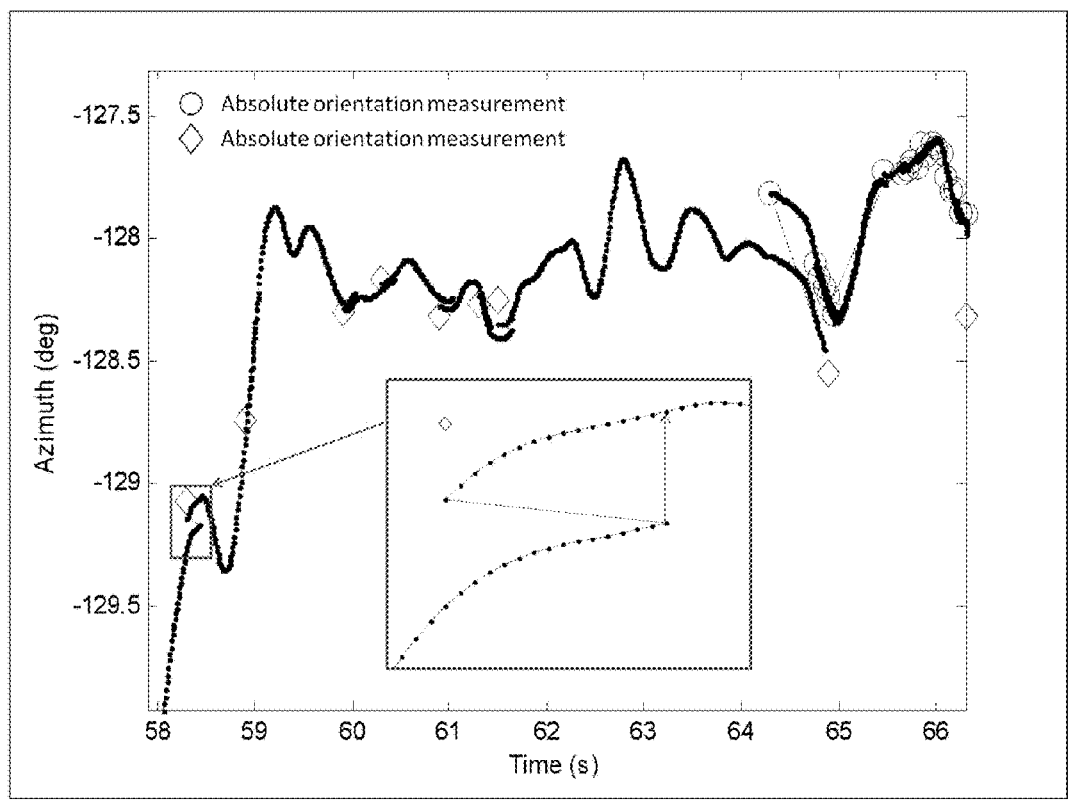
FIG. 6 shows a close-up look at an azimuth update based on a representative absolute orientation measurement useful in the system and methods of described technology; as depicted in the inset of the figure, the EKF goes back in time using the rewind buffer to reprocess the azimuth estimate based on the delayed absolute orientation measurement.

The processing module may use a circular rewind buffer (RB) to maintain a record of relevant information pertaining to the last $N_r$ samples of EKF processing. This is done to properly integrate absolute orientation measurements, which are delayed with respect to the rest of the data (as depicted in FIG. 5, a qualitative timing diagram of the EKF processing herein above described). By this buffer, when absolute orientation information is processed and delivered, the EKF can reprocess past information. In the processing module 2 the absolute orientation data acquisition is synchronized with the sensor data acquisition. This reprocessing of past data is handled within a single EKF epoch $\Delta t$. FIG. 6 shows a close-up look at an azimuth update based on a representative absolute orientation measurement. The EKF is able to "go back in time" and use the rewind buffer to reprocess the state estimate based on the late measurement, all within its regular processing interval. In the example illustrated in the inset in FIG. 6, the EKF goes back in time using the rewind buffer to reprocess the azimuth estimate based on the delayed absolute orientation measurement.

The processing module may further use a forward buffer (FB) to store both the current state estimate $x_k^+$ and the predicted state estimates up to $N_f$ time steps ahead. That is $FB_k=\{x_k^+, x_{k+1}^-, x_{k+2}^-, \ldots, x_{k+N_f}^-\}$. Through interpolation of the FB vectors, a state estimate can then be produced for any $t \in [t_k, t_k+N_f\Delta t]$ where $t_k$ is the time of the current estimate and $\Delta t$ is the EKF's processing interval. Given a value $\Delta t_d$ for system latency, the pose that is delivered at the time $t_k$ for rendering graphic on the display is based on the predicted state at $t=t_k+\Delta t_d$, which is extracted from the FB. $N_f$ must be selected such that $N_f>0$ and $N_f\Delta t \geq \Delta t_d$.

Prior to use, the sensors 13 of the described technology should be calibrated. Hardware calibration of the motion sensing and visualization kit consists of estimating $C_d^b, r_{pd}^b, C_a^b,$ and $r_{pa}^b$. Estimation of the relative orientation, $C_a^b$, of the sensors with respect to the body coordinate system is performed by known procedures, which also yields an estimate of the camera's intrinsic parameters. Estimation of the relative orientation, $C_d^b$, of the display 14 with respect to the body coordinate system is performed by an iterative process based on using an initial $C_d^b$ estimate to render scene features (e.g., edges) from camera imagery onto the display 14, and adjusting it until the rendered features align with the corresponding actual scene features when reviewed through the display 14. The position vectors $r_{pd}^b$ and $r_{pa}^b$ can be obtained by straightforward measurement, but in fact they are negligible in the context of this application, the former because $\|r_{pd}\| \ll \|r_{ps}\|$, and the latter because its magnitude is very small and was empirically determined to have negligible effect. The magnetometer 133 is also calibrated prior to each operation.

The initial state x(0) is estimated by using sensor readings during the first few seconds of operation before the EKF process starts. The initial condition of all biases is set to zero.

The processing module 2 uses a number of parameter values that have been tuned experimentally prior to system use. These are values for Q, $R_k$, the initial estimated error covariance matrix P(0), and a number of parameters that are used for disturbance detection, filtering, etc. This tuning may be performed by combining Allan variance analysis of sensor data with the models herein described, to identify a starting point, and then performing a series of focused field experiments.

The forward-prediction process extrapolates motion to predict the state at some time in the future, and is inherently sensitive to noise. This may result in jitter (i.e., high-frequency small-amplitude motion) of the rendered graphics even when the system is perfectly stationary (e.g., mounted on a tripod). Low-pass filtering of the rate gyro signal, $u_g$, transmitted to the processing unit reduces this jitter effect but also introduces a time lag between real-world motion and motion of the corresponding symbology rendered on the display. Since this lag is not noticeable when the rotation rate is near zero, and the jitter is not noticeable when there is actual motion, in some embodiments the described technology achieves a reduction in perceived jitter by low-pass filtering the rate gyro signal only when the estimated rotation rate magnitude $\|u_g - b_g\|$ is small (e.g., less than 5 deg/s). As specified below, this is done by adjusting the low-pass filter's bandwidth using a smooth increasing function of estimated rotation rate magnitude. The adaptive gyro filtering method is implemented in the processing module of the described technology by using the discrete-time filter $\tilde{u}_{g,k} = a\tilde{u}_{g,k-1} + (1-a)u_{g,k}$ with $a = A \exp(-0.5\|u_{g,k} - b_g\|^2/\sigma_a^2)$ where $0 \leq A < 1$ and $\sigma_a > 0$ are parameters that are established prior to use (e.g., A=0.85, $\sigma_a$=0.05). The resulting filtered signal can then be used in place of $u_g$ in the EKF's time-propagation steps (i.e., in the forward-prediction process).

A single pose estimation processing step takes as inputs the current sensor data, the RB data, and an index $i_{now}$ corresponding to the current-time location in the RB. It returns updates to RB, $i_{now}$ and the whole FB. An example of its implementation is as follows:

```
1:   pre-process sensor date
2:   RB[i_now] ← {sensor data, pre-processed data}
3:   i_stop = i_now
4:   if vision data is available and ∃ i_vis : t_CLK in RB[i_vis] =
         t_CLK in vision data then
5:       i_now = i_vis
6:   end if
7:   keep_processing = true
8:   while keep_processing = true do
9:       {x⁻, P⁻} ← RB[i_now]
10:      RB[i_now] ← {x⁺, P⁺} = ekf_u(x⁻, P⁻, RB[i_now])
11:      i_next = i_now + 1
12:      RB[i_next] ← {x⁻, P⁻} = ekf_p(x⁺, P⁺, RB[i_now])
13:      if i_now = i_stop then
14:          FB[0] ← x⁺, FB[1] ← x⁻
15;          for k_p = 2 to N_f do
16:              {x⁻, P⁻} = ekf_p(x⁻, P⁻, RB[i_now])
17:              FB[k_p] ← x⁻
18:          end for
19:          keep_processiag = false
20:      end if
21:          i_now = i_next
22:  end while
``` where $t_{CLK}$ is the reference time stamp of both sensor and vision data acquisition, and lines 10 and 12 are the EKF measurement update and prediction steps, respectively. The loop on lines 15-18 implements the forward-prediction process by repeating single EKF prediction steps.

Figure 7:
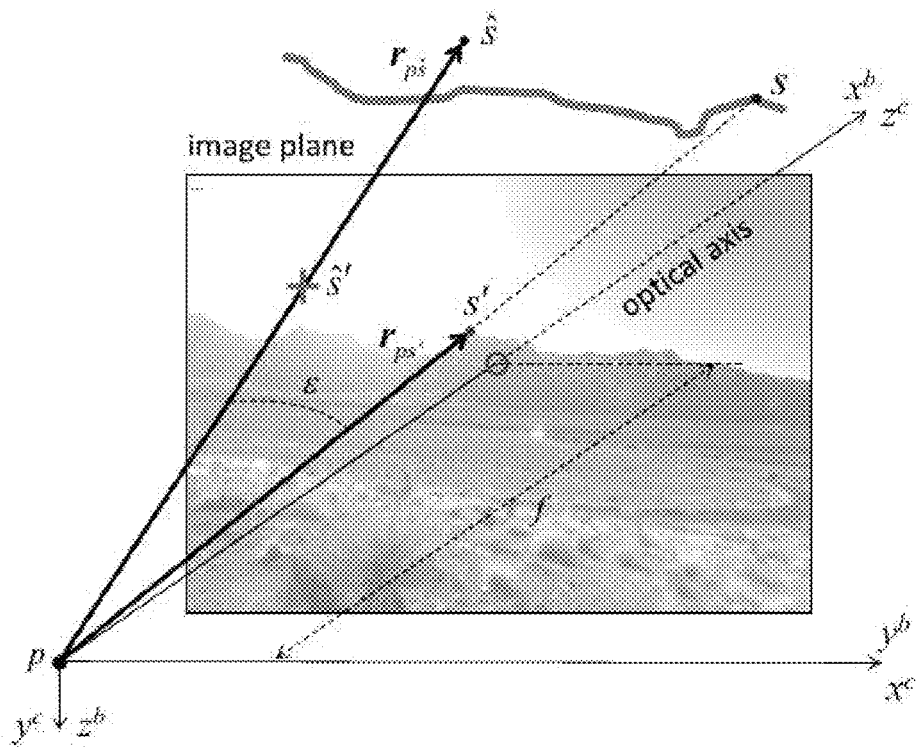
FIG. 7 depicts the geometry behind the definition of the error measure in the augmented reality application of the described technology.

Accuracy performance is based on a measure of error, $\epsilon$, defined as the angle between the vectors $r_{ps}^b$, and $r_{p\hat{s}}^b$, as depicted in FIG. 7. The point s' is the point in the undistorted camera image corresponding to the real-world reference point s, and is obtained via semi-automatic processing (i.e., requiring some manual input) of the imagery. The vector $r_{p\hat{s}}^b$ is the result of using the pose estimate, $\{p_p, C_b^n\}$, to compute $r_{p\hat{s}}^b$. Note that, in addition to pose estimation errors, the process of generating the 'ground-truth' vector $r_{ps}^b$, also contributes to $\epsilon$.

Absolute orientation may be achieved by the processing module 2 of the described technology executing methods of landmark matching, horizon matching, and Sun-matching. The landmark matching (LM) method uses imagery from the camera 12 to track the location of a distant object of known coordinates and provide a measurement of orientation to the EKF. Prior to operation, the user must select a feature in the environment (i.e., a landmark) that can be visually recognized during operation and whose coordinates are known by the system (stored in the database). Once in the area of operation, the user overlays a cross hair—rendered on the display 14 and corresponding to the intersection of the camera's optical axis with the image plane on the selected landmark and clicks a mouse button (coupled to and in communication with the processing module 2 of the described technology). This procedure is called "landmark clicking."

Landmark clicking triggers the system to extract features from the current image and compute the corresponding absolute orientation of the camera 12 (and therefore the body coordinate system) using the known direction of the optical axis and the EKF's current estimate of roll angle. The combination of extracted features and absolute orientation is stored as a landmark key-frame in the database, which can be compared to later images to determine their corresponding camera orientations. Once the landmark key-frame is generated by the user, the LM method uses computer vision techniques to determine orientation.

Regarding the extraction of features in a given image, the processing module 2 extracts FAST corners in the undistorted image and calculates their BRIEF descriptors. The tilt estimate from the EKF is then used to align the BRIEF descriptors with respect to the down axis of the n coordinate system, eliminating the need for rotational invariance and increasing the discrimination power of the BRIEF descriptors compared to feature descriptors, such as Oriented BRIEF (ORB), that use image gradient information to orient the descriptors.

It is important to maintain robustness to the user walking short distances where the landmark is still in view after moving. Therefore, nearby image features which move due to parallax as the user walks must be separated from far features, which do not move. This can be done by a model-fitting approach consisting of fitting either an essential matrix, in the case where features are close, or a rotation matrix when all of the features are far away. In practice, it was found that in most cases features at intermediate distances exhibited a small degree of parallax yet still fit a rotation-only hypothesis model within the required accuracy. The small parallax in these features, however, was enough to create a bias in the rotation estimate and caused a corresponding orientation error to be passed on to the EKF. To alleviate this issue, a simple heuristic approach to feature selection is implemented, based on choosing only features that are above a threshold distance from the camera (e.g., 20 meters). This distance is computed using the EKF's tilt estimate and the assumption of a flat ground in front of the camera. Ultimately, robustness of LM to translation depends on the user being trained to use it only for distant landmarks, without nearby objects in the scene to cause parallax.

After extraction, features in the current image are matched to features in the landmark key-frame based on their BRIEF descriptors, calculating the best matching feature as the one with minimum Hamming distance. For each feature in the landmark key-frame, its best match in the current image is computed. The same is done from the current image to the landmark key-frame and only those matches that agree in both directions are deemed valid. After matching, a two point RANSAC procedure is applied to find the rotation between the two frames and eliminate outliers. Because the camera is calibrated, only the three degrees of freedom of the relative rotation between the landmark key-frame and current images need to be estimated. Two feature matches provide four constraints and so over-constrain the solution. Each potential rotation solution is scored in the RANSAC procedure by rotating the current image's features according to the inverse of the rotation and applying a threshold to the distance to the corresponding feature matches in the landmark frame. The number of feature matches satisfying the threshold is the score for that solution.

Before delivering a measurement of orientation to the EKF, a few additional checks should be satisfied. At least M feature-matches are required between the landmark key-frame and the current frame after RANSAC. This prevents incorrect rotations with little support in the features from being passed to the EKF. The RANSAC procedure must also exceed a minimum target confidence in its solution. This confidence is calculated as the probability $p=1-(1-i^s)^n$, where n is the number of RANSAC iterations, s is the number of points selected at each iteration, and i is the inlier ratio. A lower bound of the true inlier ratio can be computed by dividing the maximum number of inliers that was observed by the total number of feature matches. An upper bound on n is set to limit processing time and meet real-time constraints, so it is possible that p may not reach the required level. The inlier ratios observed in practice and the small number of points selected (i.e., s=2) result in a high-enough p most of the time. A final check is that the angle between the optical axis of the landmark key-frame and that of the current frame be less than 20 degrees, insuring adequate overlap between the two images.

A key feature to the LM method of the processing module of the described technology is that the object needs to be visible to the user but not necessarily to the camera. Since the LM method tracks FAST corner features around the landmark object, these features need not be on the landmark object itself.

The horizon matching (HM) method provides a measurement of absolute orientation by comparing edges detected in the camera imagery with a horizon silhouette edge generated from DTED, using a hierarchical search computation initialized at the current orientation estimate from the EKF. In contrast to traditional horizon-matching models, the method of the described technology uses real-world data and can generate refined orientation measurements at 20 Hz with current hardware. Further the methods of the described technology overcome problems with the prior art which seek only a strong-gradient edge in an image, not necessarily present under all lighting conditions and in cases of severe occlusions by foreground objects. The method described here is robust to both of these disturbances because it uses only the more stable parts of the horizon, without computationally expensive methods that prevent use in real-time low-SWAP applications.

The basic principle of the HM method of the described technology is that given the user's position and a 3D height map of the surrounding terrain (stored in the database), a corresponding 360-degree horizon can be computed. If accurate alignment can be found between the computed horizon and the horizon extracted from the camera imagery, then the camera's absolute orientation can be determined.

After transforming the DTED into ECEF coordinates, the processing module determines the corresponding shape of the horizon from the user's estimated current position. This 3D terrain model is then rendered onto a unit sphere centered at the user's position, where the rendering resolution is chosen to match the native resolution of the camera. To support automatic extraction of the horizon silhouette, the 3D terrain model is rendered as a white surface onto a black background, so that the horizon extraction becomes a simple edge detection. Using the inverse of the camera calibration matrix, each pixel along the horizon is converted to its corresponding image vector, and normalizing these vectors yields a spherical representation of the horizon silhouette.

Given the spherical representation of the horizon silhouette, several optimizations can be performed to improve the computational efficiency. To facilitate data compression and improve processing efficiency, a continuous connected chain is created that represents the 360-degree horizon silhouette. First, edges are extracted from the projected spherical image followed by a known edge-following computation in the image to define an edge chain. While the edge chain is a very good representation of the horizon, it is also a very dense representation posing computational challenges for the alignment. This leads to a second step in which the pixel-resolution chain is reduced to a much smaller set of line segments that satisfy a maximum tangential distance. The resulting piece-wise linear representation typically reduces the complexity of the horizon and greatly boosts the computational efficiency.

To extract a horizon from the camera imagery, edge detection is performed by the processing module of the described technology on each undistorted image by first blurring with a Gaussian filter and then using a Sobel filter along both the horizontal and vertical directions. From this, the squared edge response is computed at each pixel location by summing the squares of the vertical and horizontal edge components. Then the image of the squared edge response is blurred again with a Gaussian filter to effectively increase the size of the edges. Finally, the processing module thresholds the edge response so that it is equal to one along the edges, and zero elsewhere. The threshold is set so that the resulting edges are around five to ten pixels wide. At this point in the process, a pyramidal representation of edge images is also created, which is used later in a course-to-fine search. To create the down-sampled images, a simple bilinear interpolation scheme is applied where the results are then rounded to maintain the binary nature of the edge image. Extracting the edges from the imagery is desirable because the actual horizon silhouette is typically an edge within the image. Thresholding can be useful because the strength of the edge along the horizon may vary, even within the same frame-to-frame video sequence. The desired approach is to treat a strong edge in the same manner as a weak edge, as each is equally likely to be the true horizon silhouette.

The processing module 2 of the described technology then performs an optimization that seeks the best alignment between the terrain's horizon silhouette and the horizon silhouette from the camera image. This process is initiated using the EKF's current orientation estimate, which is used to transform the horizon silhouette into the expected image. The obtained horizon edge image (given a perfect alignment) would correspond to the observed horizon silhouette in the camera frame. Once the silhouette has been projected onto the image using a computed alignment, a measure of goodness is assigned to this alignment, based on the amount of overlap between the projected horizon and the edges in the camera edge image. Given that a single-pixel width silhouette is being aligned with the edges in the camera edge image, wide edges are needed to help account for any sight differences between the DTED-based horizon and what is actually seen in the image. For instance, a forest of trees along the top of a mountain ridge will slightly alter the shape of the ridge, but will still exhibit a strong resemblance to the shape of the underlying terrain. The wider edges result in a more robust measure of goodness that allows for slight misalignments without excessive penalty. Additionally, the measure of goodness favors segments of longer overlap as their orientation is more reliable.

To determine optimal alignment, the processing module of the described technology performs an orientation search in a region that is centered on the orientation reported by the EKF. To obtain the global maximum in the search region, a hierarchical multi-start gradient ascent technique is used. The search space is first sampled coarsely and uniformly, and several local gradient searches are started from those samples. Once each local search is completed, the maximum of all local searches is taken to be the global maximum. Then, using a coarse-to-fine approach, the result is upsampled, and a new search begins at the next highest resolution. When the final search completes, the resulting orientation measurement is produced along with a confidence metric. This metric reflects preference for longer overlapping segments as well as segments that vary in their shape, which is equivalent to a high-gradient entropy of the segment. Before the orientation measurement is sent to the EKF, the corresponding confidence metric has to exceed a relatively high threshold (e.g., 98%) to prevent measurements coming from false positive matches from corrupting the EKF's measurement update.

Figure 10:
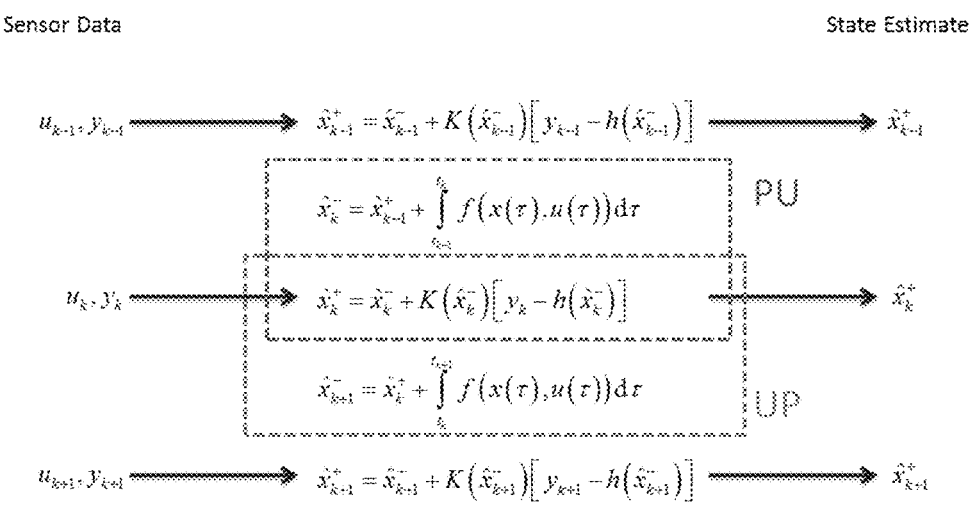
FIG. 10 depicts the predict-update (PU) cycle and the update-predict (UP) of an EKF method useful in the described technology.

EKF implementations repeatedly perform either a predict-update (PU) cycle or an update-predict (UP) cycle (shown in FIG. 10). The difference between these two cycles amount to the time of availability of the state estimate: the UP cycle implementation can produce an estimate sooner relative to the time when sensor data is available. In either case only current measurement data $y_k$ are utilized to estimate the current state (current input data $u_k$ are not).

Figure 11:
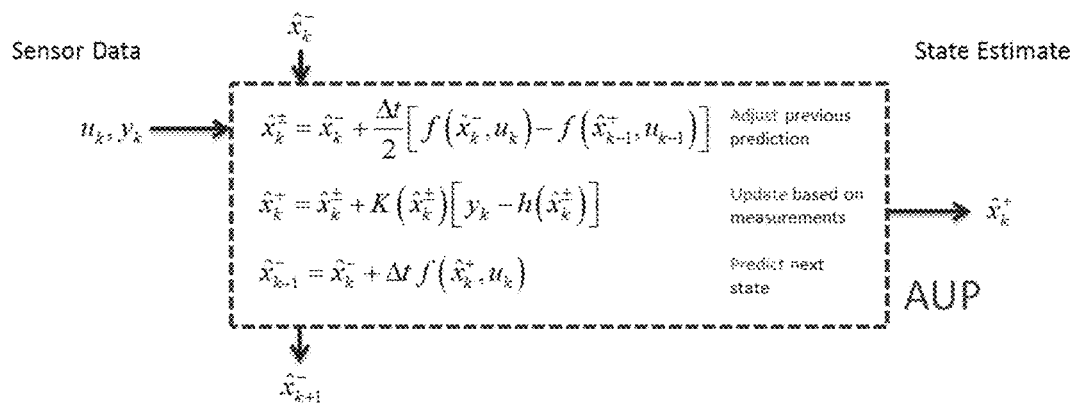
FIG. 11 depicts an adjust-update-predict cycle useful in the described technology.
Figure 12:
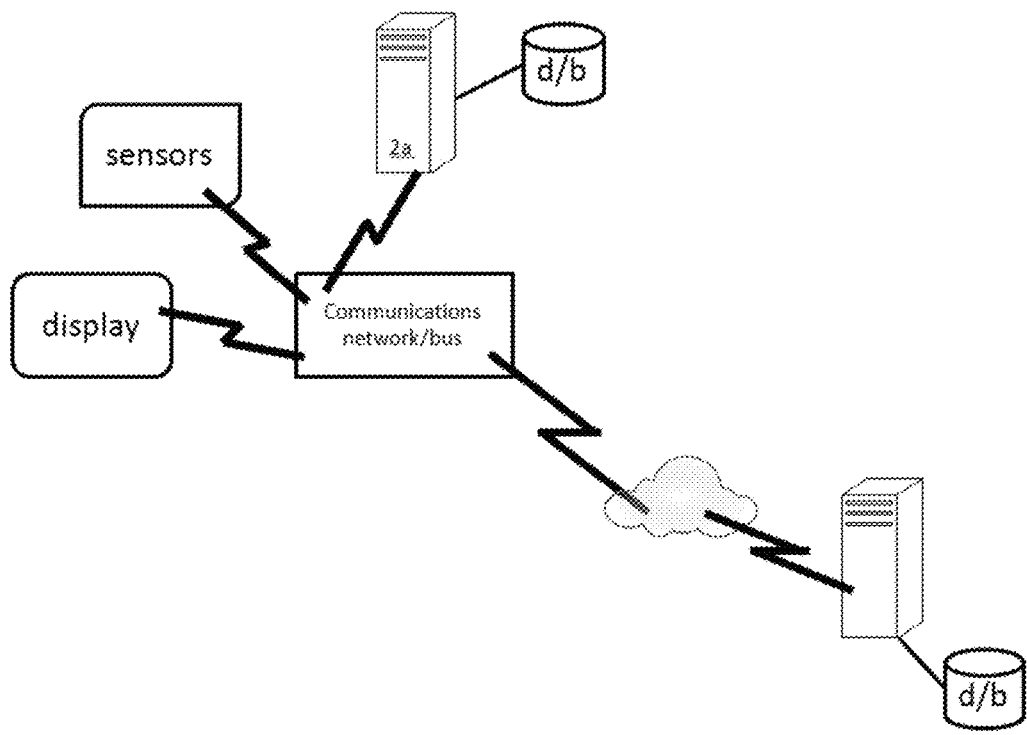
FIG. 12 is a block diagram representing an exemplary environment in which the present disclosure or parts thereof may be implemented.

The processing module may adjust the previous prediction by including the effects of the current input data before executing the update step. This adjust-update-predict (AUP) cycle (shown in FIG. 11) has the effect that both current measurement data $y_k$ and current input data $u_k$ are used to estimate the current state. Therefore, the AUP cycle implementation is more responsive than the UP cycle to changing input u, provides a better estimate to the update step, and requires very little additional computation.

In some embodiments of the described technology the processing module 2 is enhanced to adjust magnetic model bias based upon an absolute azimuth input. The reference magnetic field vector $m^n$ is the Earth's magnetic field vector, expressed in n coordinates, and is modeled as $$m^n = \begin{bmatrix} \cos(\hat{\alpha} - b_\alpha)\cos(\hat{\gamma} - b_\gamma) \\ \sin(\hat{\alpha} - b_\alpha)\cos(\hat{\gamma} - b_\gamma) \\ \sin(\hat{\gamma} - b_\gamma) \end{bmatrix} B_m$$

where $B_m$ is the Earth's magnetic field strength, $\hat{\alpha}$ and $\hat{\gamma}$ are the values of magnetic declination and inclination, respectively, obtained from a reference Earth magnetic model. Because they are otherwise not observable, updating of the corresponding biases, $b_\alpha$ and $b_\gamma$, is only allowed when an absolute orientation measurement is available.

Figure 8:
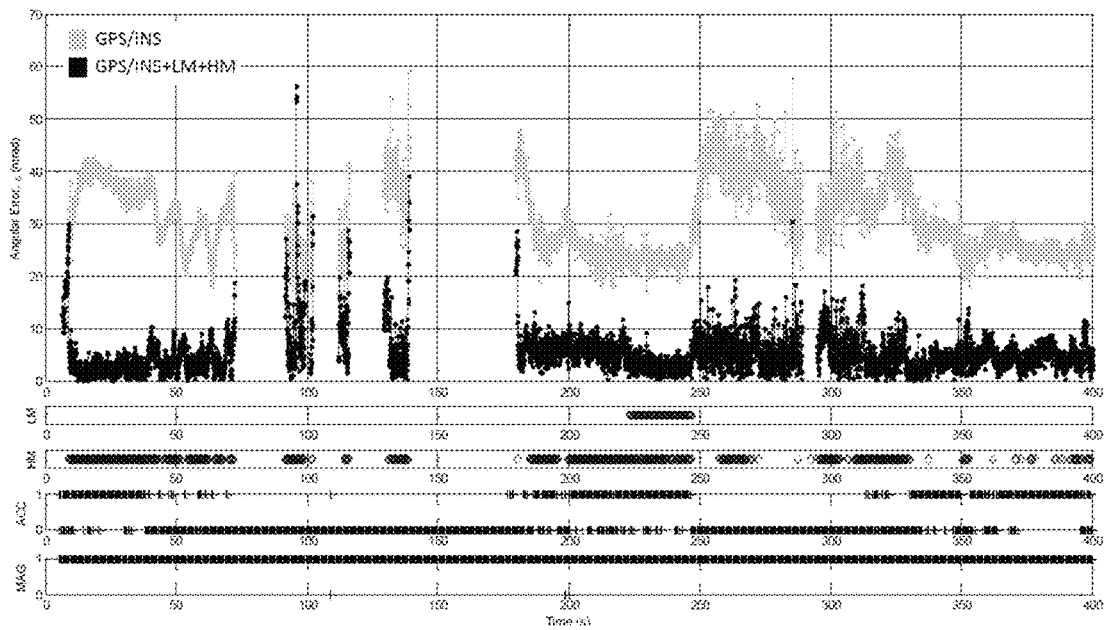
FIG. 8 shows integrated system accuracy performance, including the validity of accelerometer (ACC) and magnetometer (MAG) data, and the availability of absolute orientation measurements.

Since estimates of magnetic biases are only updated when an absolute orientation update has occurred, the benefit of absolute orientation measurements persists even when they are no longer available because they have helped to correct the magnetometer measurement model. This is evident, for example, over the ten seconds around t=280 in FIG. 8, showing integrated system accuracy performance—including indicators such as the validity of accelerometer (ACC) and magnetometer (MAG) data and the availability of absolute orientation measurements (LM and HM)—where there is a gap in the availability of absolute orientation measurements, and yet the pose estimate retains its accuracy because of an improved magnetometer measurement model. Without this method, the performance would revert back to that of GPS/INS when absolute orientation is not available.

Using the magnetic bias estimation method, the following modifications occur to the EKF equation structure hereinabove described. The state is now defined as $x=[p_p; v_{ep}^n; q_{nb}; b_g; b_a; b_\alpha; b_\gamma]$ wherein $b_\alpha$ and $b_\gamma$ are biases in the model of local magnetic declination and inclination values, respectively. The process model is now specified by:

$$\dot{p}_p = f_p(x) + w_p$$

$$\dot{v}_{ep}^n = C_b^n(u_a - b_a - w_a) + g^n - (\omega_{en}^n + 2\omega_{ie}^n) \times v_{ep}^n + w_v$$

$$\dot{q}_{nb} = \frac{1}{2}\Omega(q_{nb})(u_g - b_g - w_g - \omega_{in}^b) + w_q$$

$$\dot{b}_g = w_{b_g}$$

$$\dot{b}_a = w_{b_a}$$

$$\dot{b}_\alpha = w_\alpha$$

$$\dot{b}_\gamma = w_\gamma$$

The process noise vector is now $w=[w_p; w_v; w_q; w_g; w_{b_g}; w_a; w_{b_a}; w_\alpha; w_{b_a}; w_\alpha; w_\gamma]$ and its covariance matrix is now $Q=\text{blkdiag}(Q_p, Q_v, Q_q, Q_g, Q_{b_g}, Q_a, Q_{b_a}, \sigma_\alpha^2; \sigma_\gamma^2)$.

In some embodiments, independently enhancing the foregoing methods is a method where Sun matching (SM) is used as a navigation aiding technique to provide an independent measurement of azimuth. The Sun appears in the camera imagery as a black spot on an otherwise bright sky. This "eclipsing" phenomenon is characteristic of many CMOS sensors and occurs when the photo-generated charge of a pixel is so large that it impacts the pixel's reset voltage and subsequently the signal-reset difference level presented to the analog-to-digital convertor. This results in saturated pixels being incorrectly decoded as dark pixels. Most CMOS sensors include anti-eclipse circuitry to minimize this effect, but this function can be disabled in the camera used in the system of the described technology—wherein the resulting black-Sun artifact enabled the use of the Sun's location in the camera image to generate a measurement of the camera's absolute orientation.

The basic method of this embodiment of the Sun-matching processing module of the described technology includes the following steps:

1. Find pixel coordinates of black-Sun centroid in undistorted camera image
2. Using a camera model, convert pixel coordinates into measured Sun vector in b coordinates, $s^b$
3. Compute reference Sun vector in n coordinates, $s^n$
4. Using EKF's roll estimate as constraint, find $C_b^n$ such that $C_b^n s^b = s^n$ The camera model is used in line 2. In line 3, using an astronomical model and knowledge of $p_p$, date and time, the reference Sun vector is computed as azimuth and zenith angles in the n coordinate system. The Sun-based orientation estimate returned to the EKF is the rotation matrix that aligns the reference Sun vector in n coordinates with the measured sun vector in b coordinates, as shown in line 4. This requirement only constrains two out of three angular degrees of freedom, so a third constraint is imposed. This constraint is that the roll angle represented in the Sun-based orientation estimate must be the same as the one in the current EKF estimate of orientation. Under this constraint, a gradient-descent optimization method is used to find the rotation matrix $C_b^n$ that most closely satisfies $C_b^n s^b = s^n$.

In some applications these systems and the methods herein described combine a novel pose estimation capability and a plurality of sensors to allow rendering of geo-registered graphics on a see-through display, thereby appearing to be part of the real environment as the user looks at the environment through a display.

The pose estimation systems and methods herein described can be implemented in a wide variety of commercial and consumer applications. First-responder or search-and-rescue personnel can see geo-registered icons representing the locations of team members, search regions, and key objects of interest during mission operations. Accessing this information in a heads-up posture enables the user to perform activities more safely, with higher operational tempo, and with greater team coordination. Construction-site or warehouse foremen can view icons representing workers and material locations to help monitor safety on the worksite and to support quick decision making about resource allocation. Oil-and-gas industry workers can view graphics representing locations of structures of interest, such as underground or underwater pipelines, system safety components, and graphical representation of important system states (e.g., pressure and temperature of storage tanks and pipeline sections). Outdoor recreational enthusiasts (e.g., runners, bicyclists, hikers) can be presented with directional information, waypoints, and details about their exact position and heading when carrying out active movement while in a heads-up posture viewing the real-world environment. For immersive training applications, users can be presented with virtual avatars that appear as part of their real-world environment as they maneuver and carry out training scenarios indoors or outdoors. Such training enables the user to practice and improve scenario-specific decision making. This immersive training may be extended to sports training applications, where athletes may use augmented and/or virtual reality to enhance their training program. The pose estimation systems and methods herein may also be applied to gaming scenarios where augmented reality and/or virtual reality is used to enhance user experience and the estimation of pose of a gaming device is required. Other applications include the transportation industry, where vehicle operators may access information that appears to part of the real-world environment, and maintenance personnel may view pertinent information overlaid on the system under maintenance/repair.

Further, the pose estimation system and methods as herein described can be implemented with a variety of display technologies, including night vision goggles, see-through displays, wearable smart glasses, and smartphone or tablet devices. For smartphone or tablet style applications, the position and orientation of the smartphone or tablet is accurately tracked while the user holds the device in an upright position in their line of sight to view the real-world while 'looking through the phone'. In this video see-through application, geo-registered graphical information is superimposed on the device's camera imagery and presented to the user real-time on the device's display.

The invention claimed is:

1. A method for adjusting an estimated spatial position and orientation of an object using a sensor, the method comprising:

using a processing module, adjusting the estimated spatial position and orientation of the object by detecting and removing bias in local magnetic declination and inclination values obtained from a reference earth magnetic model, wherein the bias in the local magnetic declination and inclination values is calculated based on one or more measurements of absolute orientation of the sensor derived from data transmitted by the sensor to the processing module; and updating the adjusted estimated spatial position and orientation on a display device.

2. The method of claim 1, wherein the sensor is a camera, and wherein the data is a vision based input.

3. The method of claim 2, wherein the vision based input is selected from the group consisting of one or more images of a landmark or its surrounding features, or the landmark and the surrounding features, images of a horizon, and images of the Sun, and combinations thereof.

4. The method of claim 1, wherein the object is a display, and wherein the method further comprises calculating the position of a location of interest relative to the display, and rendering a graphic on the display representing the location of interest using the calculated position of the location of interest.

5. One or more tangible computer-readable storage media encoding computer-executable instructions for executing on a computer system a computer process comprising:

adjusting an estimated spatial position and orientation of an object by detecting and removing bias in the local magnetic declination and inclination values obtained from a reference earth magnetic model, wherein the bias in the local magnetic declination and inclination values is calculated based on one or more measurements of absolute orientation of a sensor derived from data transmitted by the sensor; and updating the adjusted estimated spatial position and orientation on a display device.

6. The computer-readable storage media of claim 5, wherein the sensor is a camera, and wherein the data is a vision based input.

7. The computer-readable storage media of claim 6, wherein the vision based input is selected from the group consisting of one or more images of a landmark or its surrounding features, or the landmark and the surrounding features, images of a horizon, and images of the Sun, and combinations thereof.

8. The computer-readable storage media of claim 7, wherein the vision based input comprises one or more images of the Sun, and wherein one or more of the measurements of absolute orientation is derived by a method comprising the steps of:
   a) detecting the Sun in the image, wherein pixels of the Sun are black,
   b) computing a Sun vector based upon the location of the Sun in the image, and
   c) calculating a measurement of absolute orientation from the Sun vector.

9. The computer-readable storage media of claim 5, wherein the object is a display, and wherein the computer process further comprises calculating the position of a location of interest relative to the display, and rendering a graphic on the display representing the location of interest using the calculated position of the location of interest.

10. A pose estimation system, the system comprising:
   a) a sensor,
   b) a processing module that
      i) receives over time data from the sensor,
      ii) estimates a position and orientation of an object, and
      iii) modifies the estimated position and orientation of the object based on detecting and removing bias in local magnetic declination and inclination values obtained from a reference earth magnetic model wherein the bias in the local magnetic declination and inclination values is calculated based on one or more measurements of absolute orientation of the sensor derived from data transmitted by the sensor to the processing module, and updates the modified estimated position and orientation on a display device.

11. The system of claim 10, wherein one of the sensors is a camera, and wherein the data is a vision based input.

12. The system of claim 11, wherein the vision based input is selected from the group consisting of one or more images of a landmark or its surrounding features, or the landmark and the surrounding features, images of a horizon, and images of the Sun, and combinations thereof.

13. The system of claim 10, wherein the object is a display, and wherein the processing module further calculates the position of a location of interest relative to the display, and renders a graphic on the display representing the location of interest using the calculated position of the location of interest.

14. A pose estimation system, the system comprising:
   a) means for receiving sensor data from one or more sensors, and
   b) means for estimating a position and orientation of an object, adjusted by detecting and removing bias in local magnetic declination and inclination values obtained from a reference earth magnetic model wherein the bias in the local magnetic declination and inclination values is calculated based on one or more measurements of absolute orientation of the sensor derived from the sensor data.

15. The system of claim 14, wherein one of the sensors is a camera, and wherein the sensor data is a vision based input.

16. The system of claim 15, wherein the vision based input is selected from the group consisting of one or more images of a landmark or its surrounding features, or the landmark and the surrounding features, images of a horizon, and images of the Sun, and combinations thereof.

17. The system of claim 16, wherein the vision based input comprises one or more images of the Sun, and wherein one or more of the measurements of absolute orientation is derived by a method comprising the steps of:
   a) detecting the Sun in the image, wherein pixels of the Sun are black
   b) computing a Sun vector based upon the location of the Sun in the image, and
   c) calculating a measurement of absolute orientation from the Sun vector.

18. The system of claim 14, wherein the object is a display, and further comprising means for calculating the position of a location of interest relative to the display, and rendering a graphic on the display representing the location of interest using the calculated position of the location of interest.

19. A method for calculating absolute orientation of an object from an image of the Sun, the method comprising:
   a) detecting the Sun in the image, wherein pixels of the Sun are black,
   b) computing a Sun vector based upon the location of the Sun in the image,
   c) calculating a measurement of absolute orientation from the Sun vector to be updated on a display device, and
   d) utilizing gradient-descent optimization to find a rotation matrix subject to a constraint such that a roll angle in a Sun-based orientation estimation is equivalent to a current Extended Kalman Filter (EKF) estimate of roll angle.

20. The method of claim 19, further comprising adjusting an estimated spatial position and orientation of an object by detecting and removing bias in local magnetic declination and inclination values obtained from a reference earth magnetic model, wherein the bias in the local magnetic declination and inclination values is calculated based on the absolute orientation measurement.

21. The method of claim 19, wherein the object is a display, and wherein the method further comprises calculating the position of a location of interest relative to the display, and rendering a corresponding graphic on the display using the calculated position of the location of interest.

22. A system for calculating absolute orientation of an object, the system comprising:
   a) a camera, designed and configured to capture and transmit images, and
   b) a processing module that
      i) receives images of the Sun from the camera,
      ii) detects the Sun in the image, wherein pixels of the Sun are black,
      iii) computes a Sun vector based upon the location of the Sun in the image,
      iv) calculates a measurement of absolute orientation from the Sun vector configured to be updated on a display device, and
      v) utilizes gradient-descent optimization to find a rotation matrix subject to a constraint such that a roll angle in a Sun-based orientation estimation is equivalent to a current Extended Kalman Filter (EKF) estimate of roll angle.

23. The system of claim 22, wherein the processing module further adjusts an estimated spatial position and orientation of an object by detecting and removing bias in local magnetic declination and inclination values obtained from a reference earth magnetic model, wherein the bias in the local magnetic declination and inclination values is calculated based on the absolute orientation measurement.

24. The system of claim 22, wherein the object is a display, and wherein the processing module further calculates the position of a location of interest relative to the display, and renders a graphic on the display representing the location of interest using the calculated position of the location of interest.

\* \* \* \* \*